Figure 1:
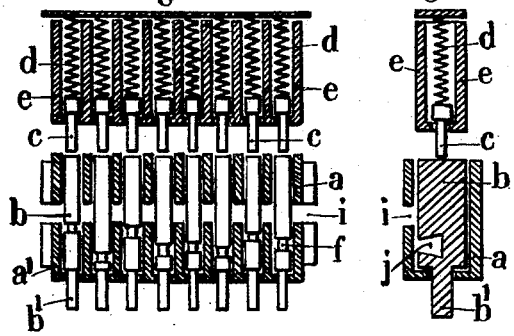

L. J. M. DARDEAU.
SAFETY DEVICE WITH COMBINATIONS FOR LOCKS OF ALL KINDS.
APPLICATION FILED JAN. 6, 1909.

1,083,061.

Patented Dec. 30, 1913.

6 SHEETS—SHEET 1.

WITNESSES:
W. M. Avery
J. P. Davis

INVENTOR
Léon J. M. Dardeau
BY Munn & Co.
ATTORNEYS

L. J. M. DARDEAU.
SAFETY DEVICE WITH COMBINATIONS FOR LOCKS OF ALL KINDS.
APPLICATION FILED JAN. 6, 1909.
1,083,061.
Patented Dec. 30, 1913.
6 SHEETS—SHEET 2.
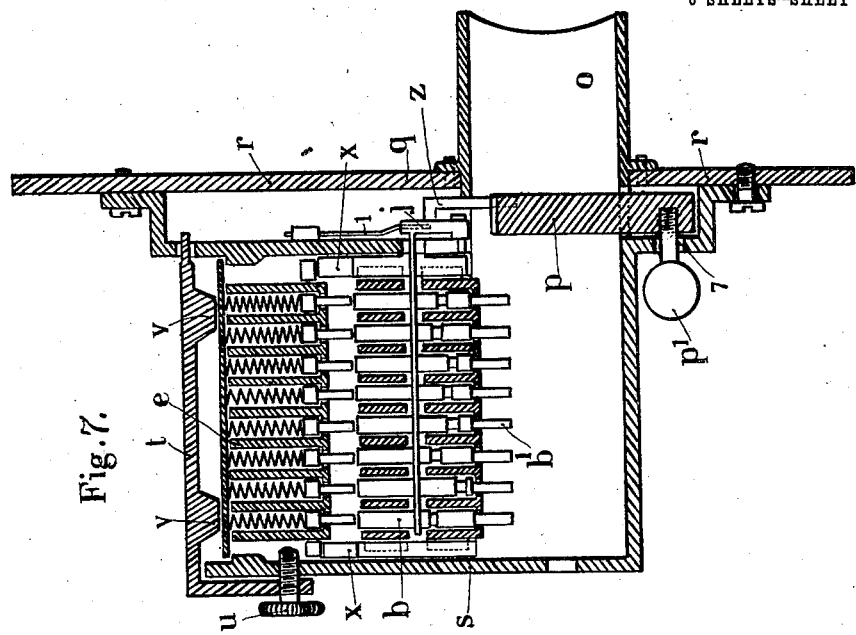
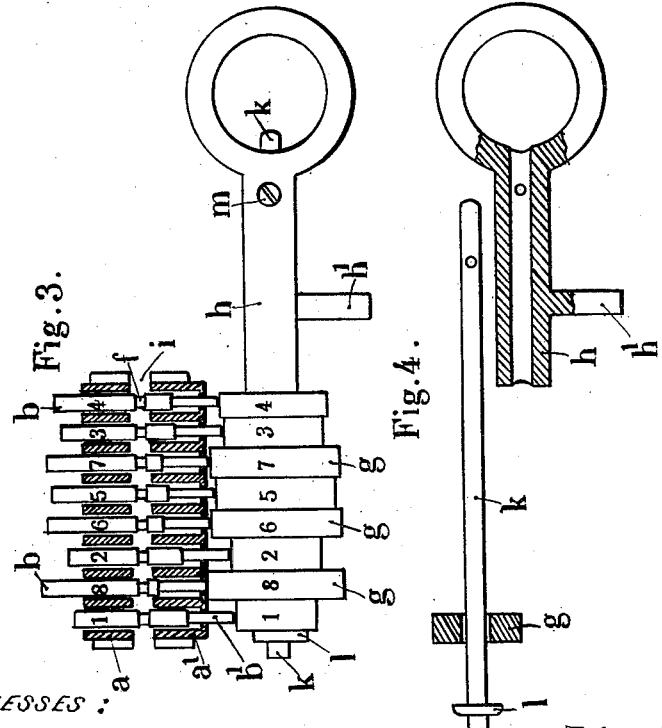
WITNESSES:
W. M. Avery
J. P. Davis
INVENTOR
Léon J. M. Dardeau
BY Munn & Co.
ATTORNEYS L. J. M. DARDEAU.
SAFETY DEVICE WITH COMBINATIONS FOR LOCKS OF ALL KINDS.
APPLICATION FILED JAN. 6, 1909.

1,083,061.

Patented Dec. 30, 1913.

6 SHEETS—SHEET 3.

WITNESSES:
W. M. Avery
J. P. Davis

INVENTOR
Léon J. M. Dardeau
BY
Munn & Co.
ATTORNEYS

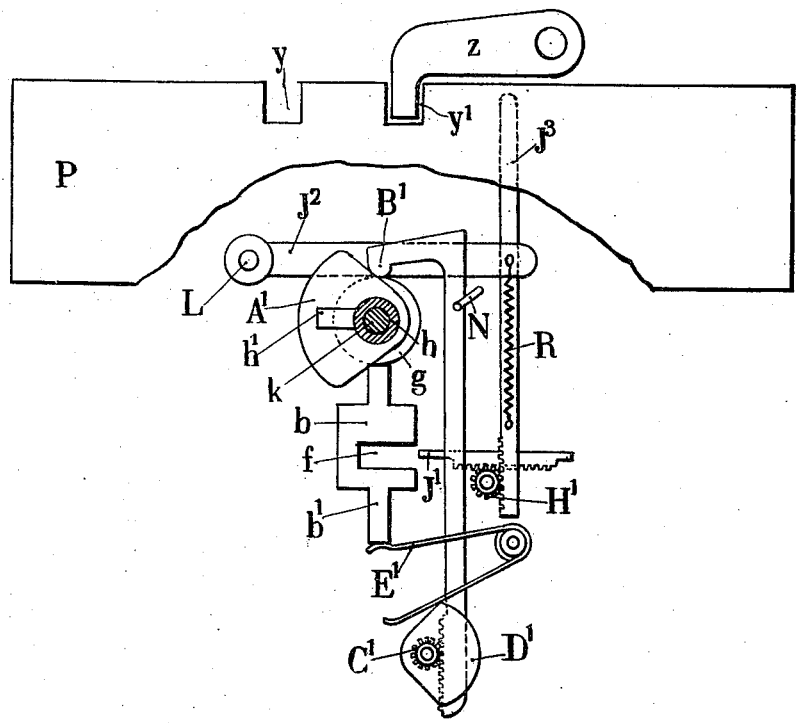
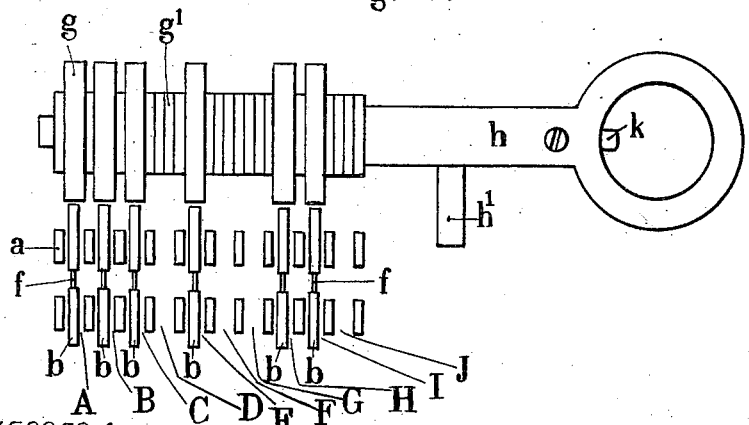

L. J. M. DARDEAU.
SAFETY DEVICE WITH COMBINATIONS FOR LOCKS OF ALL KINDS.
APPLICATION FILED JAN. 6, 1909.

1,083,061.

Patented Dec. 30, 1913.

L. J. M. DARDEAU.
SAFETY DEVICE WITH COMBINATIONS FOR LOCKS OF ALL KINDS.
APPLICATION FILED JAN. 6, 1909.

1,083,061.

Patented Dec. 30, 1913.

6 SHEETS—SHEET 6.

WITNESSES:
W. M. Avery
J. P. Davis

INVENTOR
Léon J. M. Dardeau
BY
Munn & Co.
ATTORNEYS

UNITED STATES PATENT OFFICE.

LÉON JOSEPH MATHURIN DARDEAU, OF PARIS, FRANCE.

SAFETY DEVICE WITH COMBINATIONS FOR LOCKS OF ALL KINDS.

1,083,061.  Specification of Letters Patent.  Patented Dec. 30, 1913.

Application filed January 6, 1909. Serial No. 471,020.

*To all whom it may concern:*

Be it known that I, LÉON JOSEPH MATHURIN DARDEAU, of 25 Rue de Lyon, in the city of Paris, Republic of France, electrical engineer, have invented a Safety Device with Combinations for Locks of All Kinds, of which the following is a full, clear, and exact description.

This invention relates to a safety device adapted to be used with locks of all kinds, having an invisible combination, which can be instantaneously changed at will.

The result accomplished by the device is due not only to the movableness of the safety elements or members located in the lock, but also to a key having removable members or counterparts in order that the change of the safety elements or members effected in the lock can also be effected instantaneously on the key, to allow of obtaining the necessary coöperation between these two parts of the lock.

This device has for its object to allow, when a key has been inadvertently lost, and when the word or member forming the combination provided within a lock is known, of opening the said lock by means of another key on which the word or number similar to the one formed in the lock to be opened, is produced without resorting to a lock-smith. By changing the combination of the lock, it cannot be opened without the key being itself transformed according to the new combination. The combination of the key and of the lock can also be modified indefinitely and as often as it is considered advisable.

Reference is to be had to the accompanying drawing forming a part of this specification in which similar characters of reference indicate corresponding parts.

Figure 2:
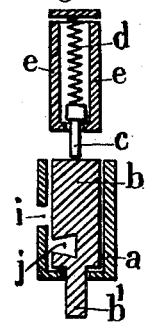
Figure 5:
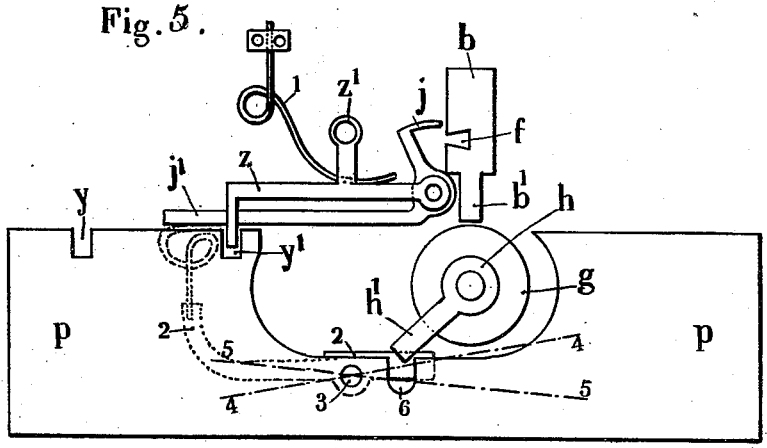
Figure 6:
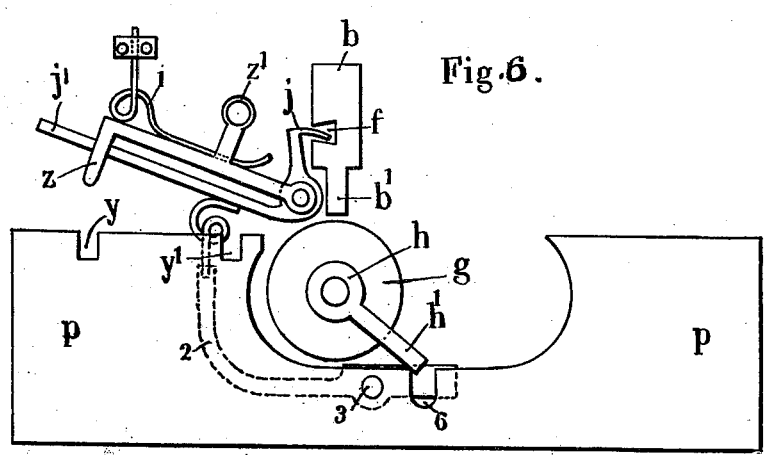
Figure 8:
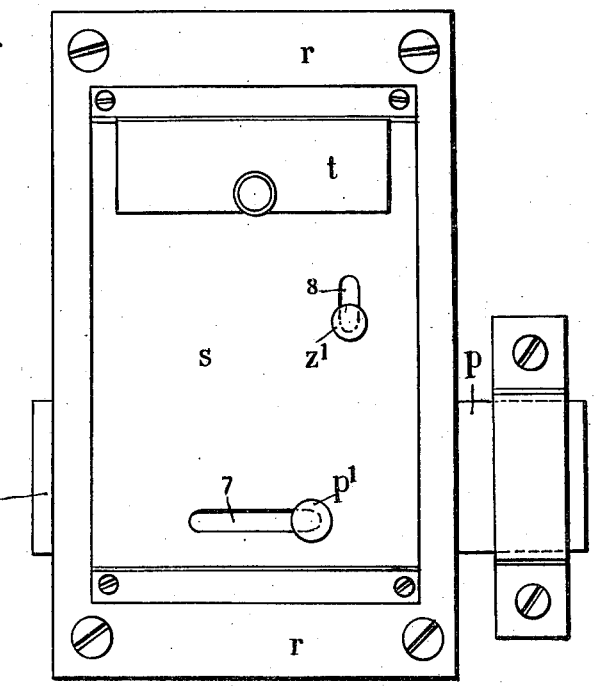
Figure 9:
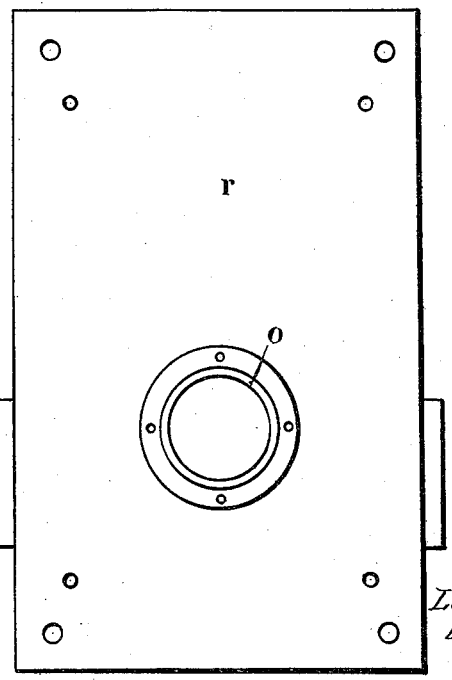
Figure 12:
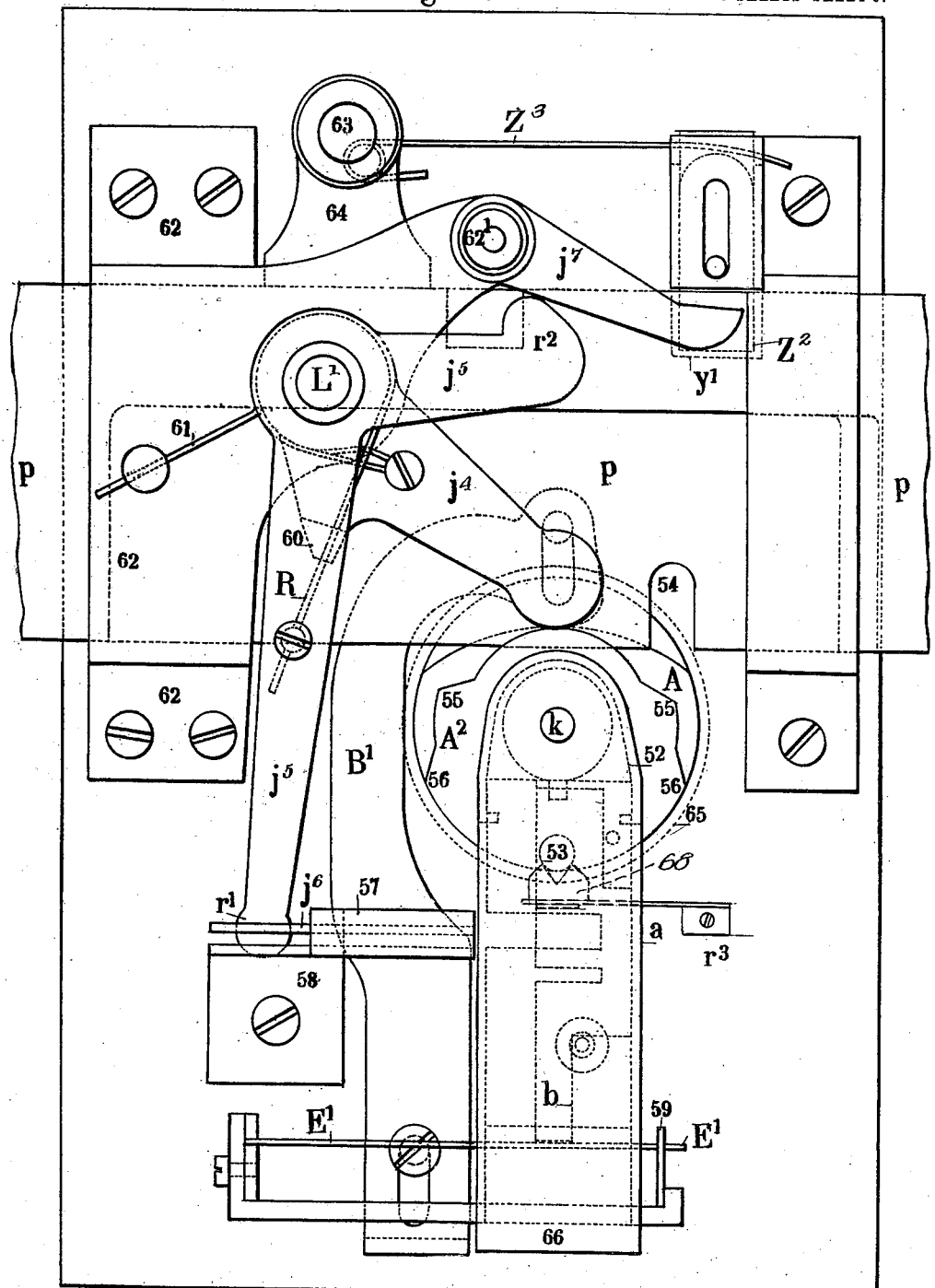
Figure 13:
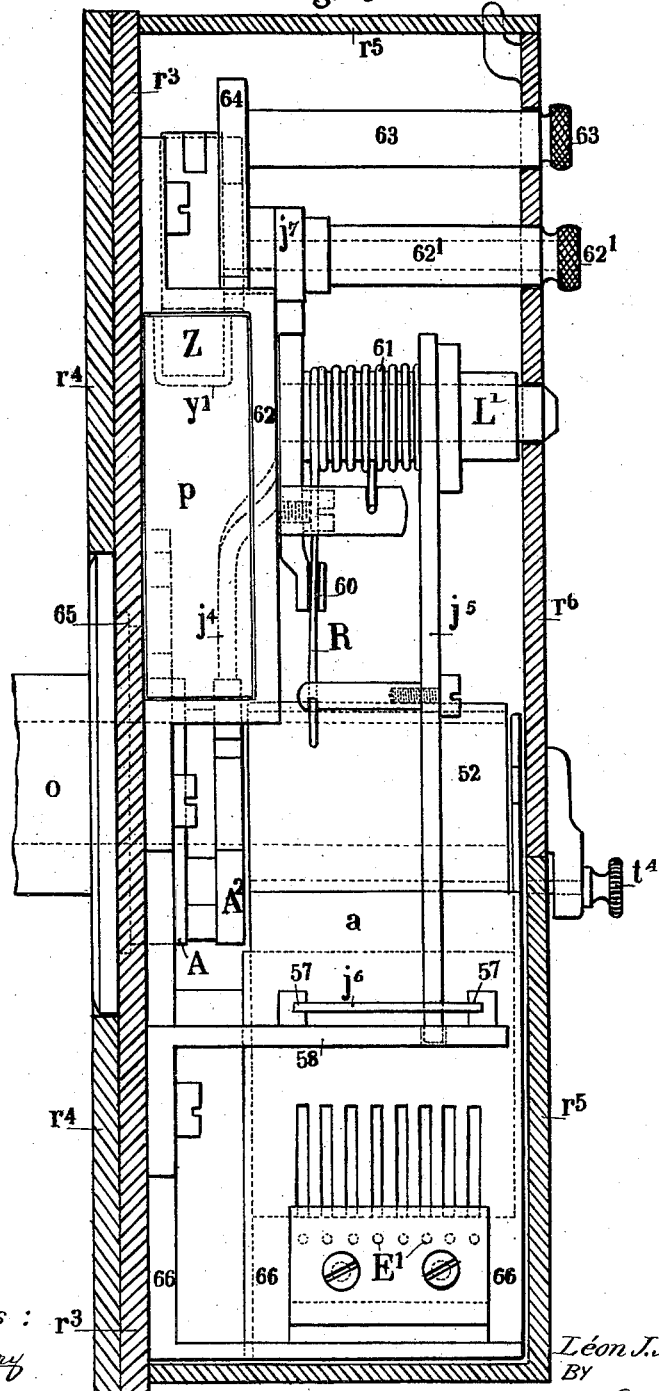

Figure 1 is a schematic view in longitudinal section of a safety device with eight elements or members; Fig. 2 is a transverse section; Fig. 3 is a side view of the device and its key adjusted for the same combination; Fig. 4 is a detail view of the key with the way of setting up the elements of the combination; Fig. 5 shows a bolt device adapted to steady the lock bolt when the key is not adjusted for the combination; Fig. 6 shows the bolt device operated by a key adjusted for the combination; Fig. 7 is a sectional view of a door lock applied; Fig. 8 is a face view of the same; Fig. 9 is a similar view of the other side of the lock; Fig. 10 shows schematically one of the forms or arrangements which can be given to the operative parts of the lock; Fig. 11 shows schematically one of the forms or arrangements which can be given to the elements or members and to the key, to obtain combinations by the simple play of the intervals between like elements; Fig. 12 is a side view of a modified form of lock, and Fig. 13 is a sectional view of the same.

As shown in Figs. 1, 2 and 3 of the drawing the safety device is constituted by a kind of stick $a$ with grooves $a'$ at the bottom of which are placed in the desired order the elements or members $b$. Each element or member of the combination is pressed to the bottom of grooves $a'$ by pushers $c$ acting under the action of gravity and of springs $d$. The whole is connected by a piece $e$ (Figs. 1 and 2) acting as a guide. Each element or member $b$ is provided with a notch $f$ (Figs. 1, 2 and 3). When this notch is moved by a corresponding element or member $g$ of the key $h$ to the height of the transverse groove $i$ of the composing stick, the groove is unobstructed, thereby enabling a nose of the catch $j$ (Figs. 5, 6 and 7) to enter the groove $i$ so as to unlock the bolt of the lock, as hereinafter described.

The device constituting the counterpart and arranged on the key comprises a rod $k$ (Fig. 4) on which are threaded the elements or members $g$ of the combination in the order corresponding to that adapted for the elements arranged in the lock as shown in Fig. 3. The rod $k$ carries at $l$ a stop for the elements or members $g$ of the combination; the end of the body $h$ of the key in which the rod $k$ fits forms another stop. This rod $k$ is secured in the body of key $h$ by a screw $m$ shown in Fig. 3, or by any other suitable means. The elements or members $g$ correspond to the elements or members $b$, and each bears the same number or the same letter, so that if the word or number on the key is identical with that in the composing stick of the lock, the notches are all at the height of the groove $i$ thereby enabling the lock to be opened. Supposing for instance that the composing stick of the lock to be arranged so as to form the number 18265734, the notches $f$ will be normally in the position they occupy (Figs. 1 and 7). Now if the number 18265734 which is the same as the number of the composing stick has been formed on the key with the elements or members $g$ and if through the key tube $o$ (Figs. 7 and 9) the key is introduced under the composing stick, the elements or members $b$ will be raised to an extent proportional to the height of their notches and the result will be a uniform height of all the notches so that they will register with the groove $i$ (Fig. 3), which enables the bit $h'$ of the key to perform its stroke for liberating the bolt $p$ of the lock, as shown in Fig. 6 of the drawing. The same result could be obtained in arranging the elements or members of the composing stick so that the springs will normally tip these elements and the key-bit to cause them to descend.

The composing stick as represented has eight elements, or members, but it may have a greater or less number of elements or members but it will be understood that the safety of the lock is proportionate to the number of elements or members which the combination comprises for the reason that the greater the number of members the more difficult to find out the exact combination, (for a single element or member $b$ which will not be operated by the key will be sufficient to prevent the nose of the catch $j$ entering the groove $i$). When an element $b$ is not sufficiently raised, its notch is too low as shown in Fig. 5, and if it is raised too much its notch is too high with reference to the groove $i$ and the catch $j$ cannot pass into the groove $i$.

In Figs. 7, 8 and 9 is shown a plate $r$ to which is secured the box or case $s$ in which the whole of the mechanism is contained. In the box $s$ is provided an opening closed by a shutter $t$. By opening this shutter, the composing stick can be removed and the combination changed. A screw with a milled knob $u$ is used for locking the shutter $t$. This shutter is internally provided with bosses $v$ which maintain the guide $e$ of the pushers against the stops $x$ above the composing stick, Fig. 7. A key tube $o$ secured to the plate $r$ (Figs. 7 and 9) is extended inside the lock to serve as a guide for the key and at same time protect the mechanism. Holes are provided in this key tube to allow the passage of the rods $b'$ which extend from the elements or members $b$ so that they can come in contact with the key. The spring-bolt $p$ has two notches $y$ $y'$ (Figs. 5 and 6) in which the pivoted bolt $z$ engages when it has attained the end of its stroke in one direction or the other. A spring 1 exerts a pressure upon the bolt $z$ and forces it into the said notches. The pivoted bolt $z$ is lifted by the tail $j'$ of the catch $j$ by means of the spring bar 2 turning upon an axis 3 connected with the spring bolt $p$ and following the same in all its movements. The bar 2 is normally inclined as indicated by the axial line 4 (Fig. 5) and it assumes the inclination of the axial line 5 under the action of the bit $h'$ of the key, Fig. 6. The bit $h'$ carries along the spring bolt by engaging a notch 6 therein. However, this displacement can only take place when all the elements or members $g$ of the key correspond with those of the composing stick of the lock and when accordingly the catch $j$ enters the groove $i$, by all the notches $f$ being brought to a same height, as above stated.

Fig. 5 shows that one element $g$ of the key is too small to raise one of the elements or members $b$ of the composing stick sufficiently to allow the catch $j$ to enter the notch $f$, the notch being too low. If the element or member $g$ was too large, the notch would then be too high and the result would be the same; the lock would not be opened.

Fig. 6 shows what occurs when all the elements of the key correspond with those of the composing stick; the catch $j$ enters the notch $f$ thereby allowing the pivoted bolt $z$ to be lifted and the spring bolt to move under the action of the bit $h'$ of the key. When it is desired to open from inside without key, the bolt $p$ is provided with a knob $p'$ sliding in a slot 7 provided in the lock casing $s$ (Figs. 7 and 8). A knob $z'$ secured upon a projection of the bolt $z$ also slides in a groove $x$ provided in the box $s$ (Fig. 8). By lifting this knob, the bolt $z$ is raised out of engagement with the notch $y$ or $y'$ thereby allowing the spring bolt to be operated by means of the bolt $p'$.

In Fig. 10 the key $h$ is provided in addition to its bit $h'$ with the cam $A'$. The cam lifts the bar $B'$ the lower part of which carries a rack gearing with the pinion $C'$ connected with the cam $D'$; the latter compresses the spring $E'$ which lifts the element or member $b$ until it engages the element or member $g$ of the key. This takes place when the key has made about one quarter of a turn. The number of springs $E'$ corresponds to that of elements $b$ and the cam $D'$ is of sufficient width to compress them all at the same time. If the elements or members $b$ and $g$ correspond, as is the case in Fig. 10, the notch $f$ is opposite the catch $j'$. In continuing to turn the key, the cam $A'$ lifts the bar $B'$. A pin $N$ on the bar $B'$ engages the lever $j^2$ which is pivoted at $L$ and lifts the same, putting the spring $R$ connected with the piece $j^3$ under tension. The bar $j^3$ carries at its lower part a rack gearing with the pinion $H'$ gearing with the rack of the catch $j'$ and causes the catch $j'$ to move toward the notch $f$. When the catch does not meet any resistance, that is to say when all the notches $f$ of the elements or members $b$ are at the same height, the bar $j^3$ following the action of the spring $R$ engages the stop bolt $z$ and disengages it from the notch $y'$ in the spring-bolt $p$. At this moment, the bit of the key or a suitable part secured to the cam A', acts upon the spring bolt and carries it along to cause it to effect its stroke. In continuing to turn the key the cam A' allows, in its second half turn, the bar B' to move down as well as all the other parts which are to move down to reassume their normal position a little before the removal of the key. The bolt $z$ then falls again into the notch $y$. In causing the key to turn in the other direction, the same effects will occur and the spring bolt $p$ will make the reverse movement. At the end of its stroke the pivoted bolt $z$ will render it immovable by falling into the notch $y'$.

Modifications of the elements or members $b$ and $g$ can be made without changing in any way the principle of the invention. Aside from the advantage of being able to modify the combination at will, the members of the combination are directly utilized, either for carrying along the spring bolt or for locking the same, as such is the case with the known systems of locks with fixed combinations wherein the elements receive directly the strain of the key in operating the bolt and are thereby likely to be warped, if attempts are made to open forcibly with a different key.

The mode of operation of the members $b$ shown in Figs. 12 and 13 comprises a cam A carried along by the bit of the key in order to lift the bar B' which carries at its lower part springs E' which are equal in number to the elements or members $b$. The eccentricity of the cam A is such that the members $b$ of the combination will touch the members $g$ at the moment when the finger 53 passing through the cams A and $A^2$ is in mesh with the notch 54 of the spring bolt $p$. At this moment, the cam $A^2$ connected with cam A and provided with two successive slopes 55 and 56, lifts the lever $j^4$ pivoted about an axis L' also common to the two-armed lever $j^5$, Fig. 12. The lever $j^4$ moves the lever $j^5$ through the medium of a spring R mounted on the common axis L'. If the combination of the key corresponds with that of the composing stick, the catch $j^6$ carried by the lower end $r'$ of the lever $j^5$ enters the notches $f$ of the members $b$ thereby enabling the lever $j^5$ to turn and to lift its upper members $r^2$ the lever $j^7$ operating the sliding bolt $z^2$. A notched pawl 68 is secured to the plate $r^3$ and extends between the cams A and $A^2$ so that the finger 53 will be in the notch when the key is in the required position to enter or come out from the key tube $o$, whereby the cams A, $A^2$ will be rendered immovable in the required position for the introduction and the removal of the key. The catch $j^6$ moves in slides 57 supported by the bow 58 shown in Figs. 12 and 13. The springs E' are guided by a comb 59 which is also shown in said figures. The spring R is put under tension by a hook 60, Fig. 12, connected with the arm $j^4$. The bolt $z^2$ is forced into the notch $y$ by a spring $z^3$. A spring 61, Figs. 11 and 13, which bears upon the bow 62 and the coils of which are interposed between those of the spring R arranged above the axis L' brings back the lever $j^5$ to secure the recoil of the catch $j^6$. The successive slopes 55 and 56 of the cam $A^2$ have for their purpose to prevent the sudden shock of the catch $j^6$ upon the members $b$ in the case where attempts would be made to open the lock with a different key. The slope 55 acts upon the lever $j^4$ as soon as the combination is found, that is to say, when the members $b$ have come in contact with the members $g$ of the key, thereby causing the catch $j^6$ to advance into the notches $f$ but without however causing it to enter entirely the said notches. The slope 56 completes the movement by causing the catch to enter into the notches of the composing stick and of the key. If however the combination is not complete, the catch bears against the members $b$ either above or under the notch, according to circumstances and the strain of the lever $j^4$ is absorbed by the spring R which is put under tension owing to the fact that the lever $j^5$ restrained by the lever $j^4$ cannot advance, and the upper end $r^2$ of the lever $j^5$ cannot engage the lever $j^7$ and the bolt $z^2$ remains engaged in the notch $y'$ so that the spring bolt $p$ is held locked. The whole of the strain of the key is then supported by the sliding bolt $z^2$. The lock can be operated from inside, without the key by means of a milled knob 62', Fig. 13, which forms the axis of the part $j^7$ used for lifting the bolt $z^2$ while the spring bolt $p$ is moved by means of a knob 63 secured to a projection 64 connected with the spring bolt.

In Figs. 12 and 13, the double cam A $A^2$ carries a collar 65 which rolls in a recess between the plate $r^3$ and the base of the key tube $o$. A frame $r^4$ secured to the plate $r^3$ adapts the lock to a door, without it being necessary to notch the wood to locate the base of the knob $o$. A box $r^5$ provided with a dismountable shutter $r^6$ which is secured by a milled knob $t'$ allows the composing stick $a$ which slides in the extension of a piece 66 used as a support to be readily removed.

I claim—

1. In a lock, a bolt, a plurality of movable members, a key for operating the bolt and movable members, said key being provided with a plurality of members corresponding to the said movable members, and means controlled by the key for locking the bolt and movable members.

2. In a lock, a bolt, a plurality of movable members, a locking device independent of the bolt operating means for alternately locking the bolt and movable members, and a key for operating the bolt, movable members and locking device.

3. In a lock, a bolt, a plurality of movable members, a key for operating the bolt and movable members, said key being provided with a plurality of members corresponding to the said movable members, and a locking device for the bolt and movable members and controlled by the key.

4. In a lock, a bolt, a plurality of movable members each provided with a groove, a key for operating the bolt and movable members, said key being provided with a plurality of members corresponding to the said movable members, and a locking device for the bolt, provided with a member for engaging the grooves of the movable members, the said locking device being controlled by the key.

5. In a lock, a bolt provided with spaced notches, a plurality of movable members, each provided with a groove or notch, a key for operating the bolt and movable members, said key being provided with a plurality of members corresponding to the movable members, and a locking device provided with members, one for engaging the grooves of the movable members and the other for alternately engaging the notches of the bolt, said locking device being controlled by the key.

6. In a lock, a bolt provided with notches, a plurality of sliding members, each provided with a notch or groove, a key for operating the bolt and movable members, said key being provided with a plurality of members corresponding to the sliding members, and a pivoted and spring pressed locking device controlled by the key and provided with members, one for engaging the grooves or notches of the sliding members and the other for alternately engaging the notches of the bolt.

7. In a lock, a bolt provided with notches, a plurality of movable members, each provided with a groove or notch, a key for operating the bolt and movable members, said key being provided with a plurality of members corresponding to the movable members, a pivoted and spring pressed catch for engaging the notches of the movable members, a member carried by the catch for alternately engaging the notches of the bolt, and a pivoted member controlled by the key for operating the catch.

8. In a lock, a bolt, a plurality of sliding members of the same length and each provided with a groove, a plurality of spring pressed rods above the members, a key for operating the bolt and movable members, said key being provided with a plurality of members corresponding to the sliding members, and means controlled by the key for locking the bolt and sliding members.

9. In a lock, a bolt, a plurality of movable members, a locking device for the movable members, and a locking device for the bolt, operated by the locking device of the said members.

10. In a lock, a bolt provided with notches, a plurality of movable members, each provided with a notch, a locking member for engaging the notches of the said movable members, a locking member for engaging the notches of the bolt, and means for operating the last locking member from the first locking member.

11. In a lock, a bolt provided with notches, a plurality of sliding and spring pressed members provided with notches, a locking member for engaging the notches of the movable members, a locking member for engaging the notches of the bolt and operated by the first locking member, and means adapted to be operated by a key for operating the first-named locking member.

The foregoing specification of my safety device with combinations for locks of all kinds signed by me this 22nd day of December, 1908.

LÉON JOSEPH MATHURIN DARDEAU.

Witnesses:
HANSON C. COXE,
MAURICE H. PIGNET.

---

Copies of this patent may be obtained for five cents each, by addressing the "Commissioner of Patents, Washington, D. C."